(12) United States Patent
Lisboa Penz

(10) Patent No.: US 12,418,522 B2
(45) Date of Patent: Sep. 16, 2025

(54) HITLESS SHARED SECRET ROTATION

(71) Applicant: Arista Networks, Inc., Santa Clara, CA (US)

(72) Inventor: Leandro Lisboa Penz, Dublin (IE)

(73) Assignee: Arista Networks, Inc., Santa Clara, CA (US)

( * ) Notice: Subject to any disclaimer, the term of this patent is extended or adjusted under 35 U.S.C. 154(b) by 170 days.

(21) Appl. No.: 17/979,568

(22) Filed: Nov. 2, 2022

(65) Prior Publication Data
US 2024/0146719 A1    May 2, 2024

(51) Int. Cl.
H04L 9/40 (2022.01)

(52) U.S. Cl.
CPC .................. H04L 63/083 (2013.01)

(58) Field of Classification Search
CPC ....... H04L 9/14; H04L 63/0428; H04L 67/10; H04L 9/30; H04L 63/123; H04L 9/3239; H04L 9/3268; H04L 2209/24; H04L 63/06; H04L 63/0823; H04L 63/1408; H04L 63/1441; H04L 9/3247; H04L 9/3278; H04L 63/0442; H04L 63/083; G06F 21/602; G06F 2009/45587; G06F 21/56; G06F 21/568; G06F 21/6236; G06F 2221/034; G06F 9/45558; G06F 9/542; G06F 21/73; G06F 21/00; H04W 4/02; H04W 4/029; H04W 12/033; H04W 40/22; H04W 4/08; H04W 4/70; H04W 4/80; H04W 4/90; H04W 12/08; H04W 4/06

USPC ............ 726/3, 2, 21, 36; 713/150, 163, 181; 380/255, 264, 276

See application file for complete search history.

(56) References Cited

U.S. PATENT DOCUMENTS

| | | | | |
|---|---|---|---|---|
| 6,973,499 B1* | 12/2005 | Peden | ................. | H04L 63/0807 709/227 |
| 7,266,681 B1* | 9/2007 | Janes | ..................... | H04L 9/0891 713/150 |
| 2002/0002466 A1* | 1/2002 | Kambayashi | ......... | H04L 9/0891 |
| 2005/0050323 A1* | 3/2005 | Mizrah | ................. | H04L 9/3273 713/168 |
| 2005/0050328 A1* | 3/2005 | Mizrah | ................. | H04L 9/0844 713/171 |
| 2007/0274518 A1* | 11/2007 | Futa | ..................... | H04L 9/3093 380/30 |
| 2009/0322510 A1* | 12/2009 | Berger | ................. | H04W 60/00 340/568.1 |
| 2013/0070925 A1* | 3/2013 | Yamada | ................... | H04L 9/08 380/255 |
| 2015/0229975 A1* | 8/2015 | Shaw | ................. | H04N 21/6587 725/10 |
| 2016/0119119 A1* | 4/2016 | Calapodescu | ....... | G06F 21/6227 380/30 |
| 2017/0053132 A1* | 2/2017 | Resch | ....................... | G06F 8/65 |
| 2017/0346851 A1* | 11/2017 | Drake | ................... | H04L 9/0838 |
| 2021/0019426 A1* | 1/2021 | Owens | ................. | G06F 21/602 |
| 2021/0021576 A1* | 1/2021 | Owens | ............... | H04L 63/0428 |
| 2022/0247736 A1* | 8/2022 | Tafazoli Bilandi | ... | H04L 63/102 |
| 2024/0176859 A1* | 5/2024 | Duval | .................. | H04L 9/3268 |

\* cited by examiner

*Primary Examiner* — Sharif E Ullah
(74) *Attorney, Agent, or Firm* — Sprinkle IP Law Group

(57) ABSTRACT

Systems and methods for protocol independent methodologies for key rotation in authentication protocols that do not invalidate ongoing authentication sessions are disclosed.

24 Claims, 6 Drawing Sheets

HITLESS SHARED SECRET ROTATION

BACKGROUND

Security in computer networks is becoming more critical and complex as networks are increasingly relied upon for communications in a variety of applications and settings. In most network architectures, security on these networks involves the authentication of devices or communications (messages) passing between devices using some security mechanism or protocol.

The authentication of such devices or messages is typically accomplished using asymmetric cryptography or symmetric cryptography. Using symmetric cryptography for such authentication involves the use of a secret value shared between devices or applications. To maintain security in these types of systems it is thus important to change this shared secret periodically. However, because the secret is "shared" (i.e., utilized by two or more devices or applications) the changing of these secrets may need to be coordinated in some manner to attempt to avoid creating windows of time where the shared secret being utilized by the devices or applications are out of sync (i.e., the shared secret being used for authentication is different at different devices or applications) resulting in a failure of the authentication mechanism during these time windows, or the invalidation of outstanding communications or sessions begun before the shared secret was switched.

What is desired then, are improved systems and methods for automatically changing shared secrets that reduces or avoids the invalidation of currently ongoing communications (e.g., authentication attempts or sessions).

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features.

DETAILED DESCRIPTION

Figure 1:
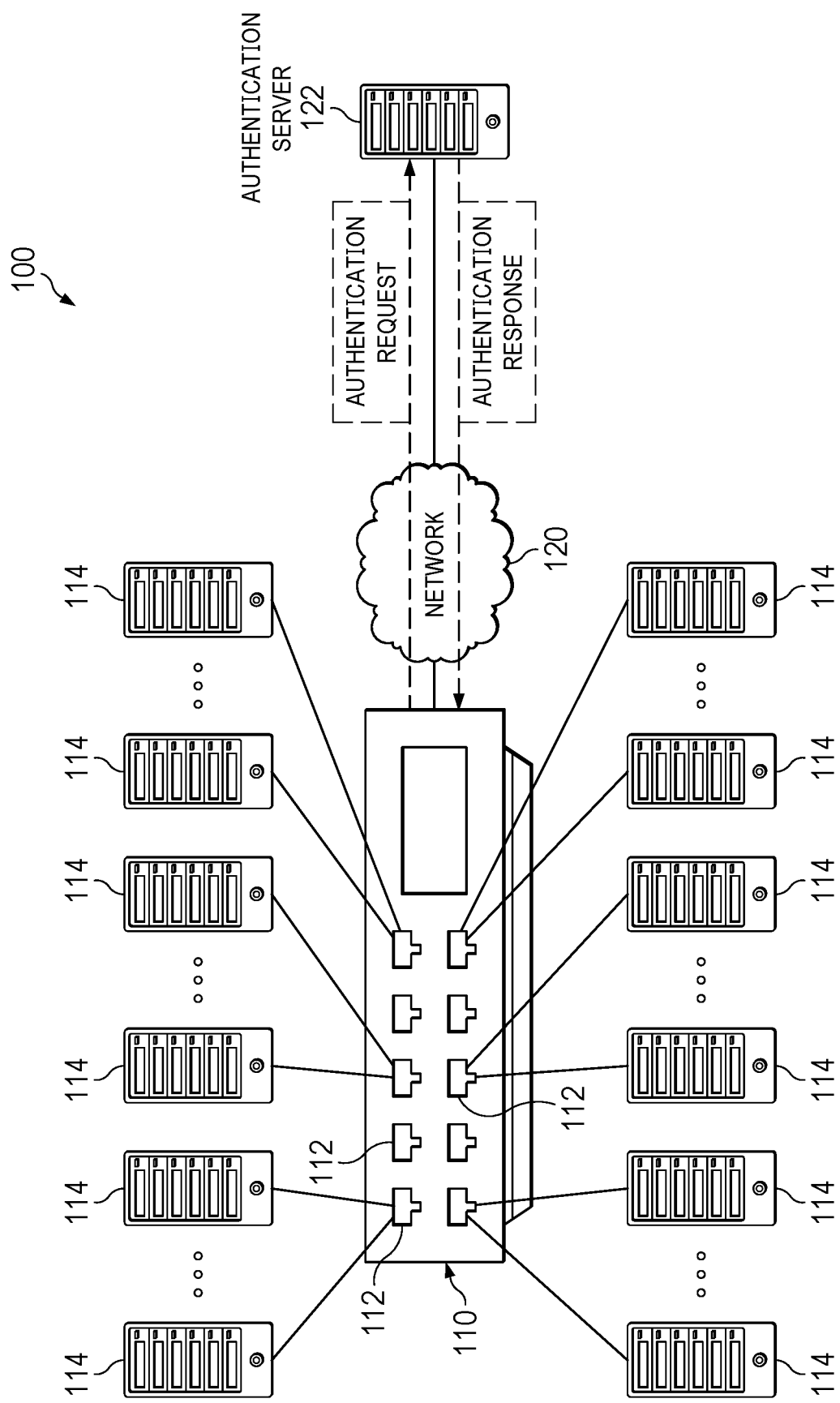
FIG. 1 is a block diagram illustrating a network environment including an embodiment of a network device and authentication server.

As discussed, security in computer networks is becoming more critical and complex as networks are increasingly relied upon for communications in a variety of applications and settings. In typical network architectures, devices (hosts) communicating in the network are connected to a network interface of a network device, such as a router or switch, which controls the flow of packets in the network. These network devices may thus be utilized to control access to such networks.

To give an example, one type of networked environment in which network devices may be effectively utilized to control access is referred to as a "campus" environment. A campus network can be thought of as a proprietary local area network (LAN) (or set of interconnected LANs) serving a university, corporation, government agency, or other organization or entity. Oftentimes, in these sorts of network environments, users desire to join, or access, the campus network, and do so through a network device in the campus network. For example, users in a conference room or classroom may access a campus network through a wired or wireless interface provided by a network device in the network.

In these types of scenarios, campus (or other types of) networks typically have some form of authentication or validation in place. This authentication can be done using authentication, authorization, and accounting (AAA), a widely used standard-based framework for controlling who is permitted to use network resources (through authentication), what they are authorized to do (through authorization), and capturing the actions performed while accessing the network (through accounting). In particular, many of these networks may authenticate users according to IEEE 802.1X, an authentication protocol to allow access to networks using an authentication server (also referred to as an authenticator).

Hosts (e.g., users at host devices) may thus access the campus network through a network device (e.g., a router or switch) serving as an authenticator. The network device can authenticate the host device using the authentication server based on credentials provided by the host device and allow, block, or otherwise control network traffic between the host and the campus network based on the result of the authentication.

Remote Authentication Dial-In User Service (RADIUS) is one example of a protocol that can be used by such an 802.1X authenticator to validate a user (referred to as an 802.1X supplicant, or just supplicant) by communicating with an AAA server (the RADIUS server) in a 802.1X topology. It can also be used to validate local authentication attempts. Generally, during an authentication session, the network device sends an authentication request (e.g., an access request, etc.) to the authentication server when a host is attempting to access the network. The authentication server can then return an authentication response (e.g., an access-accept response, access-reject, access-challenge response, etc.). To illustrate in more detail, when authenticating a supplicant, a network device can generate a RADIUS Access-Request message with several properties describing the supplicant, and with a property wrapping a supplicant's Extensible Authentication Protocol (EAP) message. The server then generates a RADIUS response (which may be a challenge), potentially with a wrapped EAP-response for the supplicant.

All RADIUS messages have authentication fields (e.g., the Request/Response Authenticator and the Message-Authenticator attribute) that are calculated using a mathematical function such as an MD5 hash or the like. The values for these authenticator fields may be generated using a secret (value) shared between the network device and the authentication server. Specifically, the shared secret (also referred to as a key) is appended to the contents of a message (e.g., packet) and the result is hashed to produce the value for the authenticator field.

According to the RADIUS protocol, then, the network device or authentication (RADIUS) server must validate messages passing between them based on this shared secret when appropriate conditions are met. The Internet Engineering Task Force (IETF) Request for Comments (RFCs) on RADIUS specify that servers and clients should drop packets if their authentication field doesn't match what is locally calculated. The RADIUS protocol also specifies that the authenticator value may be generated on a per-packet basis. In request messages, the generation of the authenticator field (e.g., the hash) is based only on the message itself and the shared secret, or is unilaterally generated and cannot be checked (e.g., depending on the type of the message). In replies, the authenticator field (e.g., the hash) is based on the authenticator field of the corresponding request being replied to and the shared secret.

From a security perspective, it is important to change this shared secret periodically. The RADIUS protocol, however, has no provisions to coordinate the change of these keys. In particular, the RADIUS protocol does not provide any mechanism for key testing or synchronization—it does not even provide a way to identify keys. Thus, these key switches have to happen both in the network device and the RADIUS server independently. As may be realized, as this secret is shared the changing of the secret must be coordinated in some manner, otherwise authentication of messages will fail, authentication sessions that are in progress may be forced to start over, or security warnings generated.

Accordingly, what is typically done is to change these secret keys in a manual or automated manner at a particular time, where that time is the "same" at the network device and the authentication server. This method of key switching is, however, problematic. The clocks of the network device and an authentication server may not be synchronized, creating a time period where the keys being utilized by the network device and authentication server are out of sync.

Moreover, this solution creates a race condition no matter how close the synchronicity is between the clocks of the authentication server and the network. For example, the time of the key switch over may occur while messages are passing between the network device and authentication server. In other words, the value of the authenticator field for a message will be created using an old value for the shared secret key and validated at the recipient using the new value for the shared secret, causing the message to be dropped by the recipient.

What is desired then, is a protocol independent methodology for key rotation (also referred to interchangeably as switching or changing) in authentication protocols that is "hitless" (e.g., does not invalidate any current authentication sessions when the shared secret is switched) while still allowing keys used as shared secrets to be changed (e.g., automatically).

To address those desires, among others, embodiments may employ a hitless key rotation architecture that allows the seamless switching of keys in a network authentication context by providing keys along with corresponding lifetimes for those keys indicating when those keys are to be active. A protocol-independent way to support hitless key rotation, then, is to have these lifetimes for the keys being switched (e.g., any old keys and the new key) overlap about the time of the switch. Here, no sessions may be invalidated when keys are switched. Instead, during these periods of overlap all keys whose lifetime has not expired may be utilized to validate messages passing between the network device and the authentication server. Moreover, a new key may be used to validate messages even before the switch is made to utilizing the new key, and the new key may always be used to send messages once the switch is made. In this manner, the use of old keys for composing in-flight messages composed before, but received after, a switch to a new key may be accounted for. Additionally, the effect of clock drifts or other sources of asynchronicity between a network device and an authentication server on the validation of messages may likewise be ameliorated, as the overlap period may be made to account for such drift.

To illustrate in more detail, according to embodiments, each of a plurality of keys configured on a network device and an authentication server may have a corresponding lifetime including a receive lifetime and a transmit lifetime. Each of the receive lifetimes and transmit lifetimes may have an associated start time and end time. The start time and end times of the transmit lifetime for a key may indicate the period when that key is active and should be utilized as a "best" key to send messages. The start times and end times of the receive lifetime for a key may indicate when that key should be utilized as an acceptable key for the validation of received messages. The receive lifetime of a key may overlap the transmit lifetime of a key to be used subsequently. Namely, the end time of the receive lifetime for a key may be later than the start time of the transmit lifetime of a subsequent key. Conversely, the start time of the receive lifetime of a subsequent key may be before the end time of the transmit lifetime of the prior key. In this manner, the lifetimes of a prior and subsequent key to be utilized as a shared secret between the network device and the authentication server may overlap.

These keys (and their lifetimes and overlap periods) may be configured on both the network device and an authentication server using, for example, a shared secret profile defining the plurality of keys and their corresponding lifetimes. Such profiles can be established by an administrative or other type of user through an interface such as a command line interface (CLI) or the like.

As such, when network devices or authentication servers operating according to embodiments receive a message, a set of accepted keys may be determined. One of these accepted keys may be a best key for validation of that message determined from the plurality of configured keys based on the current time and a start time of the corresponding transmit lifetime for each of the plurality of keys. Additionally, one or more other accepted keys can be determined from the other plurality of keys based on the current time and an end time of the corresponding receive lifetime for each of the other plurality of keys. The validation of the message can be attempted using the accepted keys. For example, validation may be attempted using the best key. The other accepted keys may also be used to validate the message when the validation of the message using the best key fails. If the message can be validated with the best key or any one of the other accepted keys the message is accepted, while if the validation of the message with the best key and the accepted keys both fail the message may be discarded.

Conversely, when a message is to be sent from network devices or authentication servers operating according to embodiments, a best key from the plurality of keys is determined based on the current time and the start time of the transmit lifetime for each of the plurality of keys. The best key may be the key of the plurality of keys where the start time of the transmit lifetime corresponding to that key is after the current time, and is the most current start time of the transmit lifetimes for each of the plurality of keys. The message to be sent can then be formed using this best key (e.g., the authentication field of the message can be created using the best key).

Certain authentication protocols may lend themselves especially well to such techniques.

For example, the RADIUS protocol specifies that authenticator values for messages may be generated on a per-packet basis. In request messages, the generation of the authenticator field (e.g., the hash) is based on only the message itself and the shared secret, or is unilaterally generated and cannot be checked (e.g., depending on the type of the message). In replies, the authenticator field (e.g., the hash) is based on the authenticator field of the corresponding request being replied to and the value of the shared secret. This methodology makes the RADIUS protocol almost stateless. Namely, the RADIUS protocol uses only session-local data and the key to generate a signature. That means that messages may be validated with multiple keys during the overlap period, and discarded only if the message cannot be validated with any of those keys.

Embodiments therefore may have a number of advantages. Both a network device and an authentication server may behave in a hitless manner by not invalidating ongoing authentication sessions during a transition period between different shared secrets as they may accept both an old and a new key. Similarly, embodiments may not introduce artificial delays to the authentication process to wait for any key synchronizations, as the overlap period may serve to account for any asynchronicity between the shared secrets utilized by the network device and the authentication server. Advantageously, even when embodiments are realized only in a network device or an authentication server some of the advantages (e.g., with respect to race conditions or the like) may be obtained. Moreover, by allowing a user to configure shared secret profiles specifying the lifetimes for such keys, embodiments may let users specify such overlap periods to their desires.

Before describing embodiments in more detail, It may be helpful to an understanding of embodiments to generally discuss the operation of embodiments of such network devices in a network environment, including authentication in such a network environment. It should be noted that while embodiments as described and disclosed herein are described and presented with respect to authentication of messages using the RADIUS protocol, embodiments may be effectively applied in almost any computing context where a rotation of shared secrets is desired, and all such embodiments are fully contemplated herein. Referring then to FIG. 1, a network environment 100 includes a network device 110 (such as a switch or a router) comprising a plurality of network interfaces 112 to which hosts 114 are connected (e.g., through a wired or wireless connection) to access network 120. The network device 110 controls the flow of packets from hosts 114 into and out of network device 110 and onto the network 120.

Embodiments of network device 110 can be usefully applied in certain network environments, such as when the network device 110 is utilized as an authenticator in a network environment 100. Here, in order to gain access to network 120, hosts 114 need to be authenticated. Network device 110 serves as an authenticator in network environment 100 to authenticate these hosts 114 using authentication server 122 (such as a RADIUS server or the like), and can control network traffic between the hosts 114 and the network 120 based on the result of the authentication.

Generally, during an authentication session, the network device 110 sends an authentication request (e.g., an access request, etc.) to the authentication server 122 when a host 114 is attempting to access the network 120. The authentication server 122 can then return an authentication response (e.g., an access-accept response, access-reject, access-challenge response, etc.). To illustrate in more detail, when authenticating a host 114 (e.g., a user at the host 114), network device 110 can generate a RADIUS Access-Request message with several properties describing the supplicant, and with a property wrapping a supplicant's Extensible Authentication Protocol (EAP) message. The server 122 then generates a RADIUS response (which may be a challenge), potentially with a wrapped EAP-response for the host 114.

These RADIUS messages have authentication fields (e.g., the Request/Response Authenticator and the Message-Authenticator attribute) that are calculated using a mathematical function such as an MD5 hash or the like. The values for these authenticator fields may be generated using a secret (value) shared between the network device 110 and the authentication server 112. Specifically, the shared secret (also referred to as a key) is appended to the contents of a message (e.g., packet) and the result is hashed to produce the value for the authenticator field.

According to the RADIUS protocol, then, the network device 110 or authentication server 122 must validate messages passing between them based on this shared secret when appropriate conditions are met and will drop packets if their authentication field doesn't match what is locally calculated. The RADIUS protocol also specifies that the authenticator value may be generated on a per-packet basis. In request messages, the generation of the authenticator field (e.g., the hash) is based only on the message itself and the shared secret, or is unilaterally generated and cannot be checked (e.g., depending on the type of the message). In replies, the authenticator field (e.g., the hash) is based on the authenticator field of the corresponding request being replied to and the shared secret.

To ensure greater security of the implementation of the RADIUS protocol in this context the shared keys utilized by the network device 110 and the authentication server 122 may be adapted to rotate keys based on key lifetimes associated with a plurality of keys configured at the network device 110. These same plurality of keys and associated lifetimes may also be configured at the authentication server 122.

When a RADIUS message to be authenticated is received at the network device 110 from authentication server 122 (or when a RADIUS message to be authenticated is received at authentication server 122 from network device 110) a set of accepted keys may be determined based on the configured keys and their respective timelines. If the message can be validated with any one of the accepted keys the message is accepted, while if the validation of the message with accepted keys fails the message may be discarded. When a RADIUS message is to be sent from network device 110 (or from authentication server 122) according to embodiments, a best key from the plurality of keys is determined based on the current time and the start time of the transmit lifetime for each of the plurality of keys. The message to be sent can then be formed using this best key (e.g., the authentication field of the message can be created using the best key if needed).

Figure 2:
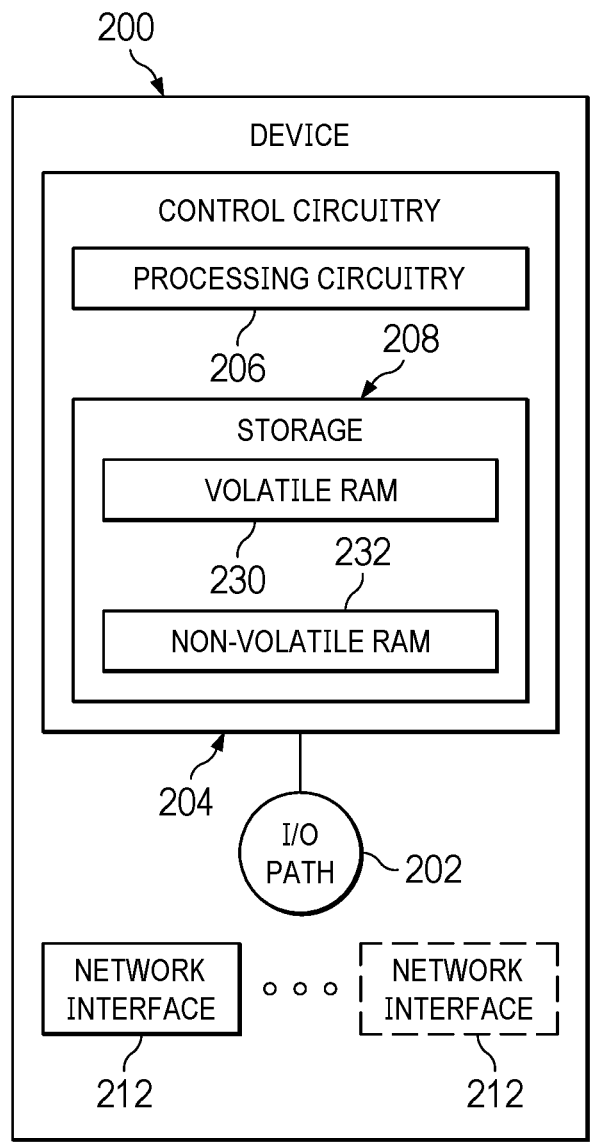
FIG. 2 is a block diagram depicting a general architecture of a network device for hitless key rotation.

FIG. 2 is a block diagram depicting a general architecture of a network device for applying per-host ACLs in accordance with certain embodiments. Network device 200 may be a router, switch, server, or any other computing device that may be configured to control or process network traffic. The network device 200 may receive data, including packets from hosts (not shown), via an input/output (I/O) path 202. I/O path 202 may provide packet data to control circuitry 204, which includes processing circuitry 206 and storage (i.e., memory) 208. Control circuitry 204 may send and receive commands, requests, and other suitable data using I/O path 202. I/O path 202 may connect control circuitry 204 (and specifically processing circuitry 206) to one or more network interfaces 212 to which other devices of a network (e.g., hosts) can be connected. These network interfaces 212 may be any type of network interface, such as an RJ45 ethernet port, a coaxial port, etc.

Control circuitry 204 includes processing circuitry 206 and storage 208. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, octa-core, or any suitable number of cores). In some embodiments, processing circuitry 206 is distributed across multiple separate processors or processing units, for example, multiple of the same type of processing units (e.g., two INTEL CORE i7 processors) or multiple different processors (e.g., an INTEL CORE i5 processor and an INTEL CORE i7 processor). The circuitry described herein may execute instructions included in software running on one or more general purpose or specialized processors.

Storage 208 may be an electronic storage device that includes volatile random-access memory (RAM) 230, which does not retain its contents when power is turned off, and non-volatile RAM 232, which does retain its contents when power is turned off. [.] As referred to herein, the phrase "electronic storage device" or "storage device" should be understood to mean any device for storing electronic data, computer software, instructions, or firmware, such as RAM, content-addressable memory (CAM) (including a TCAM), hard drives, optical drives, solid state devices, quantum storage devices, or any other suitable fixed or removable storage devices, or any combination of the same.

According to embodiments, a plurality of keys may be stored in storage 208 along with a corresponding lifetime including a receive lifetime and a transmit lifetime for each key. These keys (and their lifetimes and overlap periods) may be configured on the storage 208 of the network device 200 using for example, a shared secret profile (e.g., a data structure in storage 208) defining the plurality of keys and their corresponding lifetimes. Such profiles can be established by an administrative or other type of user through an interface such as a command line interface (CLI) or the like provided by the network device 200.

Control circuitry 204 executes instructions for implementing hitless shared secret rotation of the plurality of keys stored in storage 208, including hitless shared secret rotation in association with an authentication protocol implemented on the device 200 such as RADIUS or the like. For example, when authenticating a received RADIUS message the control circuitry 204 may determine a set of accepted keys from the plurality of accepted keys in storage 208 based on the corresponding receive lifetimes of each of the plurality of keys and attempt validation of the message using the accepted keys. If the message can be validated with any one of the accepted keys the message is accepted, while if the validation of the message based on each of the accepted keys fails, the message may be discarded.

Control circuitry 204 may also be adapted to send a RADIUS message using the plurality of keys stored in storage 208 by determining a best key from the plurality of keys based on the current time (e.g., when the message is being sent) and the start time of the transmit lifetime for each of the plurality of keys. The best key may be the key of the plurality of keys where the start time of the transmit lifetime is after the current time and is the most current start time of the transmit lifetimes for each of the plurality of keys. The message to be sent can then be formed using this best key by control circuitry 204 (e.g., the authentication field of the message can be created using the best key).

Figure 3:
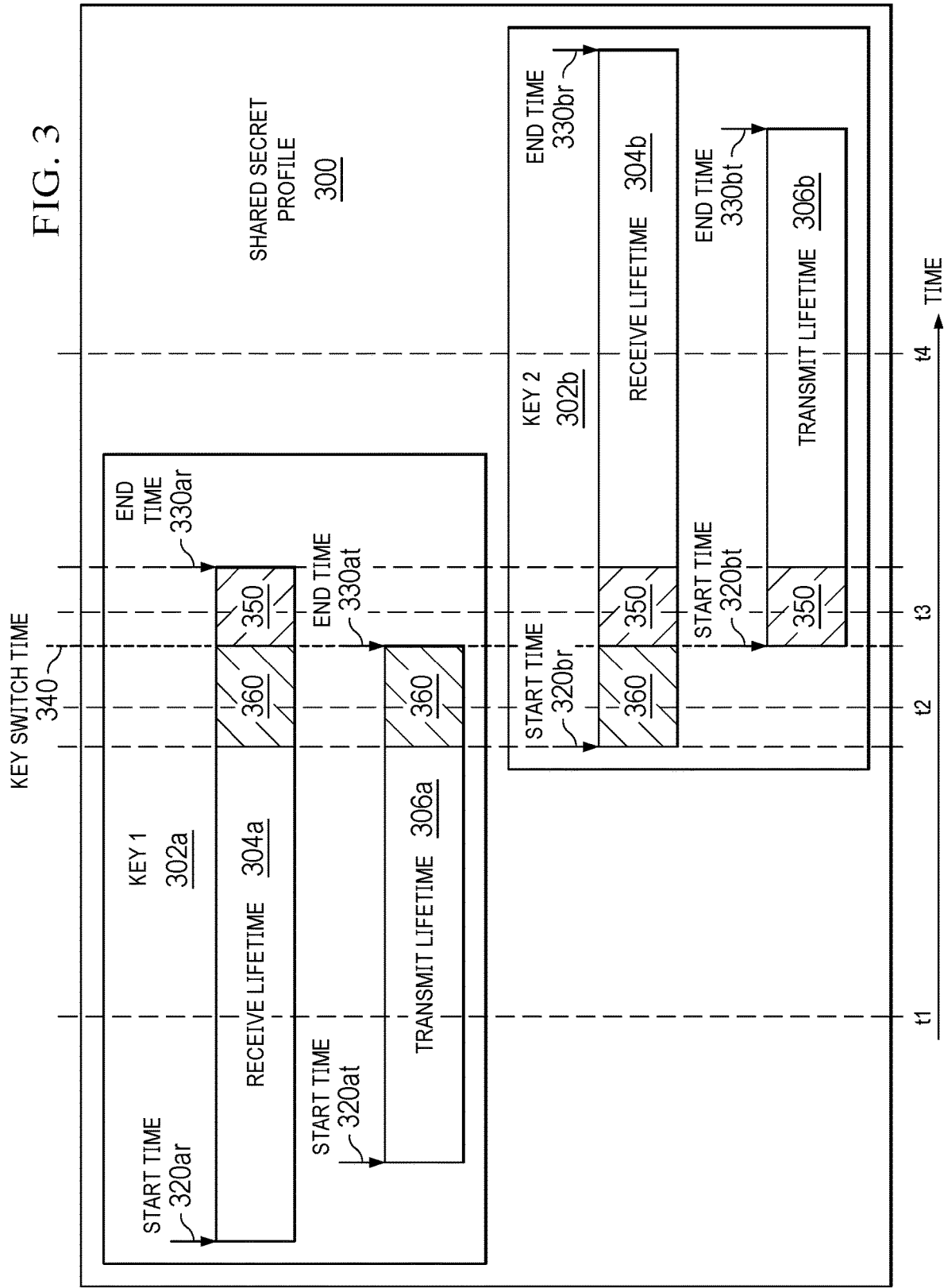
FIG. 3 is a block diagram depicting an example of an embodiment of a shared key profile.

Examples of shared secret structures that may be stored at a network device in accordance with certain embodiments are depicted in FIG. 3. Here, a shared secret profile 300 may include a plurality of key (structures) 302, where each key structure 302 is associated with a particular value to be utilized as a key. While only two key structures 302 have been depicted in shared secret profile 300 for ease of illustration, it will be understood that more key structures 302 may be included in a shared secret profile 300 or multiple shared secret profiles 300 may be utilized at a network device without loss of generality.

These key structures 302 may be configured to be used sequentially such that (the value of) one key (e.g., key 2 of key structure 302*b*) may be used subsequently to (the value of) a previous key (e.g., key 1 of key structure 302*a*). Each key structure 302 thus has a corresponding lifetime defined for the associated key value, including a receive lifetime 304 and a transmit lifetime 306. Each of the receive lifetimes 304 and transmit lifetimes 306 may have an associated start time 320 and end time 330. The start time 320 and end time 330 of the transmit lifetime 306 for a key structure 302 may indicate the (time) period when the associated key is active and should be utilized as a best key to send messages. The start time 320 and end time 330 of the receive lifetime 304 for a key structure 302 may indicate when the associated key should be utilized as an acceptable key for the validation of received messages. The receive lifetime 304 defined for a key in a key structure 302 may overlap the transmit lifetime defined in a key structure 302 of a key to be used subsequently. Namely, the end time 330 of the receive lifetime 304 defined in the key structure 302 for a (previous) key may be later than the start time 320 of the transmit lifetime 306 defined in the key structure 302 of a subsequent key. Conversely, the start time 320 of the receive lifetime 304 of a subsequent key may be before the end time of the transmit lifetime 306 of the prior key. In this manner, the lifetimes of a prior and subsequent key to be utilized as a shared secret between the network device and the authentication server may overlap.

To illustrate specifically, key profile 302*a* may define a receive lifetime 304*a* and transmit lifetime 306*a* for a key (key 1) which may be configured to be used prior to a subsequent key (key 2) associated with key profile 302 such that the subsequent key (e.g., key 2 of key profile 302*b*) may be used subsequently to previous key (e.g., key 1 of key profile 302*a*). Accordingly, transmit lifetime 306*a* of key profile 302*a* for key 1 may define the time during which key 1 is active and should be utilized as a best key to send messages while transmit lifetime 306*b* of key profile 302*b* for key 2 may define the time during which key 2 is active and should be utilized as the best key to send messages. End time 330*at* of transmit lifetime 306*a* of key profile 302*a* for key 1 and start time 320*bt* of transmit lifetime 306*b* of key profile 302*b* for key 2 may be substantially the same. Accordingly, at this key switch time 340 a network device may stop using key 1 as the best key to send (e.g., RADIUS) messages and may begin using key 2 as the best key to send messages.

Here, notice that the end time 330*at* of receive lifetime 304*a* defined for key 1 in key structure 302*a* is later than the start time 320*bt* of the transmit lifetime 306*b* defined in the key structure 302*b* of subsequent key 2. Thus, during the time period 350 (e.g., the time between the key switch time 340 (the end time 330*at* of transmit lifetime 306*a* for key 1 and the beginning of transmit lifetime 306*bt* of transmit lifetime 306*b* for key 2) and the end of time 330*ar* of receive lifetime 304*a* of key 1 both key 1 and key 2 may be utilized by a network device as accepted keys for receiving messages (e.g., the authentication of received RADIUS messages by an authenticator or authentication server).

Also notice that in some cases, start time 320*br* of the receive lifetime 304*b* of subsequent key 2 may be before the end time 330*at* of the transmit lifetime 306*a* of the previous key 1 (and before the end time 330*ar* of the receive lifetime 304*a* of previous key 1). In this manner, the transmit lifetime 306*a* of previous key 1 and the receive lifetime 304*b* of subsequent key 2 may overlap. Accordingly, during time period 360 (e.g., between the start time 320*br* of receive lifetime 304*b* of key 2 and the end of transmit lifetime 306*a* of previous key 1) both key 1 and key 2 may be utilized as accepted keys by a network device for receiving messages (e.g., the authentication of received RADIUS messages by an authenticator or authentication server).

As can be seen then, using a shared secret profile 300, both key 1 and key 2 may be used as accepted keys to receive messages during overlap time period 360 when key 1 is still used as the best key to form (e.g., RADIUS) messages to send and, additionally, both key 1 and key 2 may be used as accepted keys to receive messages during overlap time period 350 when key 2 is subsequently used as the best key to form (e.g., RADIUS) messages to send. In this manner, by configuring a network device (e.g., and an associated authentication server) using a shared secret profile such shared secret profile 300, clock synchronization issues between a network device and an authentication server may be ameliorated by using all keys whose receive lifetime has not expired to validate messages passing between the network device and the authentication server Previous keys can still be used as an accepted key to validate messages even after a switch has been made to forming messages using a subsequent key, and subsequent keys can be used as an accepted key to validate messages even before the switch is made to utilizing that new key. In this manner, the use of old keys for composing in-flight messages composed before, but received after, a switch to a new key may be accounted for. Additionally, the effect of clock drifts or other sources of asynchronicity between a network device and an authentication server on the validation of messages may likewise be ameliorated, as the overlap period may be made to account for such drift.

Figure 4:
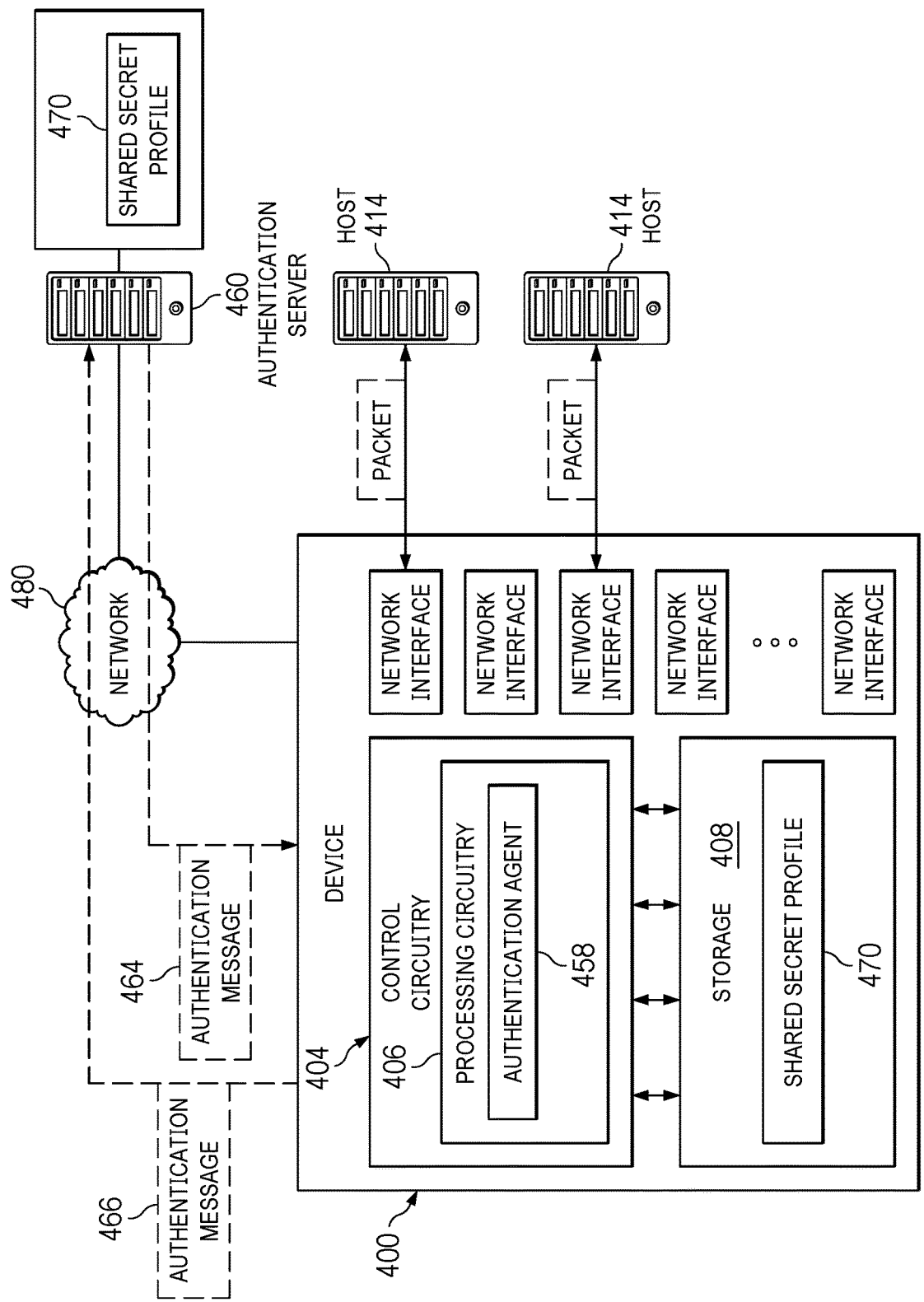
FIG. 4 is a block diagram of an embodiment of a network system including an embodiment of a network device and embodiment of an authentication server.

FIG. 4 is a more detailed depiction of an embodiment of a network system including an network device 400 and an authentication server 460 where device 400 serves as an authenticator in the networked environment. Specifically, authentication agent 458 may be configured to authenticate hosts 414 using authentication server 460 based on credentials provided by hosts 414 such that network device 400 can allow, block, or otherwise control network traffic between the hosts 414 and network 480 based on the result of the authentication. Authentication agent 458 may be implemented in hardware, software, or any suitable combination of hardware and software (e.g., in control circuitry 404). For example, authentication agent 458 may be a software program stored on storage 408 (e.g., non-volatile RAM) and executed by processing circuitry 406. Authentication server 460 may be a RADIUS server or the like configured to receive authentication messages 466 (e.g., authentication requests or the like) from network device 400 and return authentication messages 464 (e.g., authentication responses or the like).

During an authentication of a host 414 by network device 400, authentication agent 458 sends an authentication message 466 (e.g., an authentication or access request, a challenge request, etc.) to the authentication server 460. The authentication server 460 can then return an authentication message 464 (e.g., an access-accept response, access-reject, access-challenge response, etc.). To illustrate in more detail, when authenticating a host 414, authentication agent 458 can generate a RADIUS Access-Request message with several properties describing the supplicant, and with a property wrapping a host's 414 EAP message. The authentication server 460 then generates a RADIUS response (which may be a challenge), potentially with a wrapped EAP-response for the host 414.

These RADIUS messages may thus have authentication fields (e.g., the Request/Response Authenticator and the Message-Authenticator attribute). The values for these authenticator fields may be generated and verified (authenticated) using a secret key (value) shared between the network device 400 and the authentication server 460. Specifically, the shared key is appended to the contents of a message and the result is hashed to produce the value for the authenticator field. The RADIUS messages may then be authenticated by the network device 400 or authentication server 460 using the shared key.

Accordingly, authentication agent 458 and the authentication server 460 may be adapted to rotate their shared secret keys based on key lifetimes associated with a plurality of configured keys. In particular, a shared secret profile 470 may be defined at the authentication agent 458 (and the authentication server 460 where the shared secret profile 470 defines the plurality of keys and their corresponding lifetimes. Such profiles can be established by an administrative or other type of user through an interface such as a command line interface (CLI) or the like.

In particular, the shared secret profile 470 defines a plurality of key structures, each key structure including a key (value) and a corresponding lifetime including a receive lifetime and a transmit lifetime, as discussed. Each of the receive lifetimes and transmit lifetimes may have an associated start time and end time. The start time and end times of the transmit lifetime for a key may indicate the period when that key is active and should be utilized as a best key to send messages. The start times and end times of the receive lifetime for a key may indicate when that key should be utilized as an acceptable key for the validation of received messages.

Accordingly, authentication agent 458 at network device 400 (and authentication server 460) may be adapted to receive a (e.g., RADIUS) message and validate the receive message based on one or more keys determined from the plurality of keys defined in the shared secret profile 470. To validate a received message, for example, a set of accepted keys may be determined based on the configured keys and their respective timelines. In particular, a current time can be determined (e.g., a time of reception of the message, a time at which the message is being authenticated or another time desired to be utilized as a current time for the authentication of a message). One or more accepted keys can be determined from the plurality of keys defined in the shared secret profile 470 based on the corresponding receive lifetimes for each of those plurality of keys. Specifically, for each of the plurality of keys defined in the shared secret profile 470 if the determined current time is between the start time and the end time of the receive lifetime defined for a key, that key may be added to the set of accepted keys for validation of the message.

The validation of the message can then be attempted using each of the determined accepted keys. The message is accepted when the message can be validated with any one of the accepted keys and discarded when the validation of the first message with (e.g., all of) the one or more accepted keys fail. In one embodiment, one of the accepted keys to utilize in validation of the message may be a best key. The best key is a key of the plurality of keys defined in the shared secret profile 470 where the start time of the transmit lifetime corresponding to that key is after the current time, and is the most current start time (e.g., is closest in time to the current time) of the corresponding transmit lifetimes for each of the plurality of keys. Validation of the message may thus be initially attempted with this best key. If the validation of the message fails with the best key, validation of the message may then be attempted with the remaining accepted keys.

Authentication agent 458 at network device 400 (and authentication server 460) may similarly be adapted to form a (e.g., RADIUS) message based on one or more keys determined from the plurality of keys defined in the shared secret profile 470. When a RADIUS message is to be sent from network device 400 (or from authentication server 460) the best key from the plurality of keys defined in the shared secret profile 470 is determined based on the current time and the start time of the transmit lifetime for each of the plurality of keys. Again, the best key of the keys defined in the shared secret profile 470 is the key where the start time of the transmit lifetime corresponding to that key is after the current time, and is the most current start time of the corresponding transmit lifetimes for each of the plurality of defined keys. The message to be sent can then be formed using this best key (e.g., the authentication field of the message can be created using the best key if needed), and the message sent.

Figure 5:
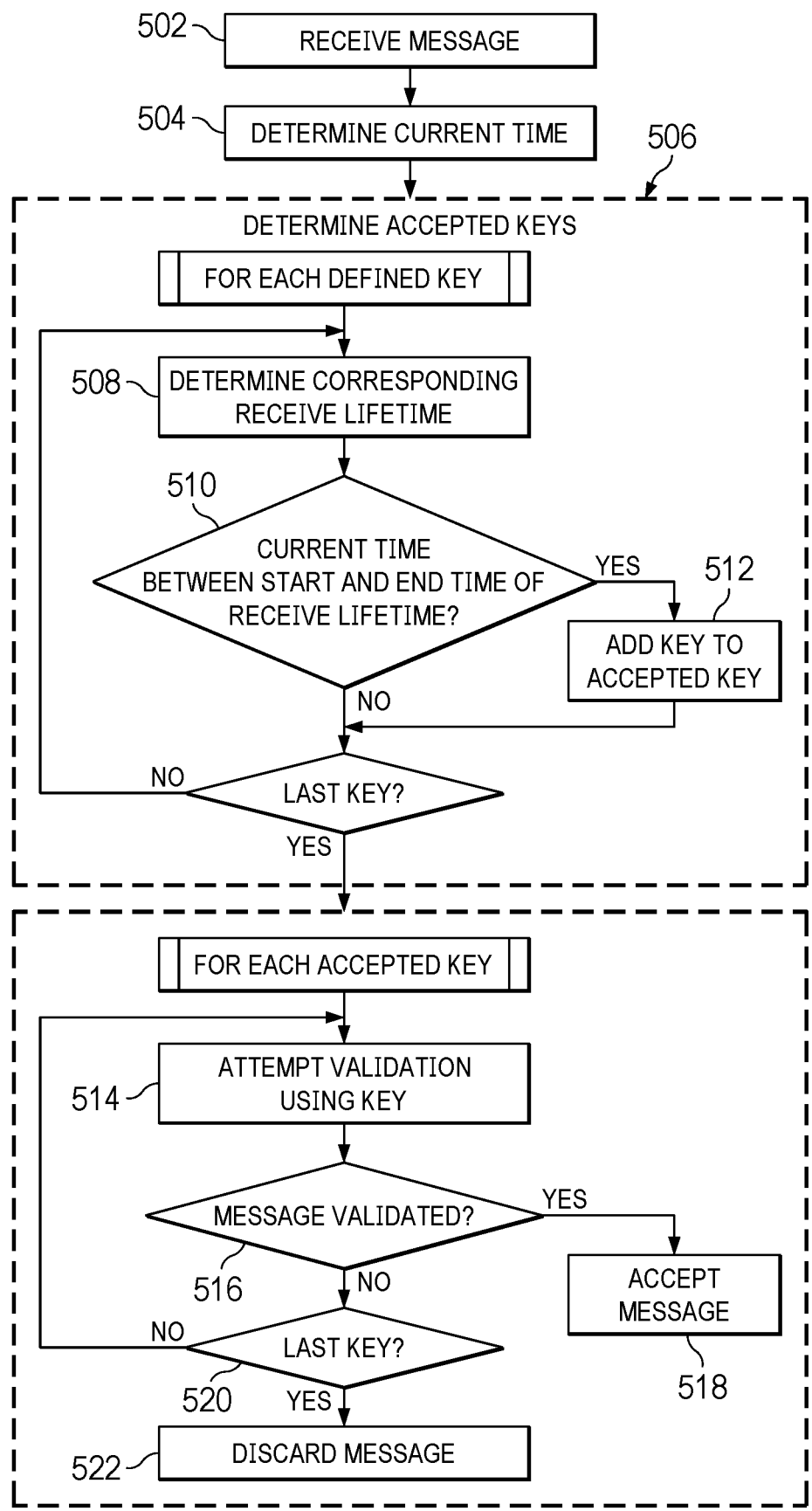
FIG. 5 is a flow diagram for one embodiment of validating a message at a network entity based on a hitless key rotation architecture.
Figure 6:
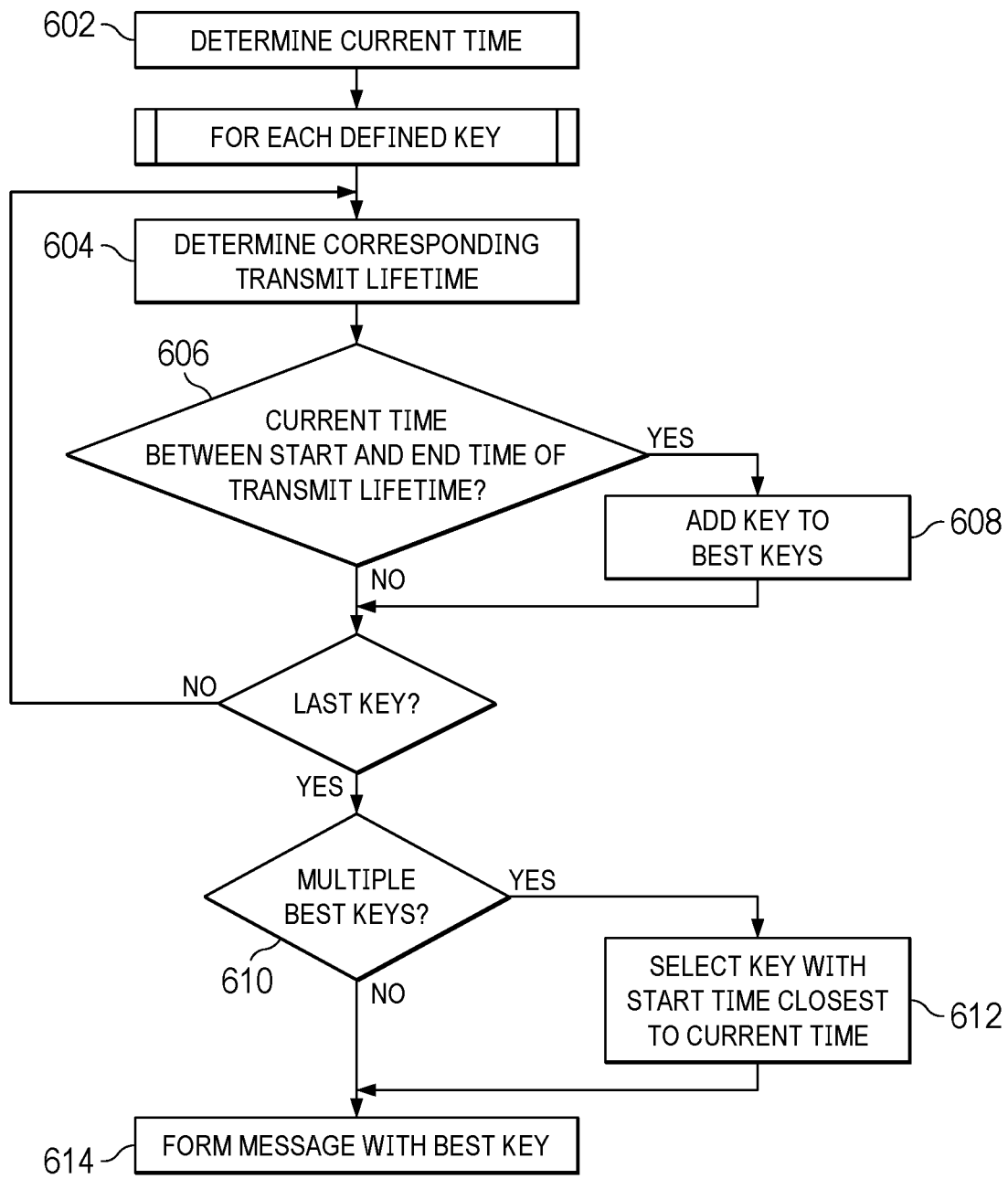
FIG. 6 is a flow diagram for one embodiment of forming a message at a network entity based on a hitless key rotation architecture.

Turning to FIGS. 5 and 6, flow diagrams for embodiments of methods that may be implemented by entities in a network architecture implementing hitless key rotation. Initially looking at FIG. 5, a flow diagram for one embodiment of validating a message at a network device or authentication server based on a hitless key rotation architecture is depicted. At some point a message to be validated is received (e.g., at a network device or an authentication server) (STEP 502). A current time can then be determined (STEP 504). One or more accepted keys can then be determined based on the current time (STEP 506).

In one embodiment, for each of a plurality of defined keys, a corresponding receive lifetime defined for that key can be determined (STEP 508). If the current time is between the start time and the end time of the receive lifetime defined for that key (Y Branch of STEP 510), that key may be added to the set of accepted keys for validation of the message (STEP 512). The validation of the message can then be attempted using each of the determined accepted keys (STEP 514). If the message is validated with an accepted key (Y Branch STEP 516), the message can be accepted (STEP 518). If the message cannot be validated with any of the accepted keys (Y Branch of STEP 520) (i.e., the validation of the message with all of the accepted keys fails) the message may be discarded (STEP 522).

FIG. 6 depicts a flow diagram for one embodiment of a method for forming a message at a network device or authentication server based on a hitless key rotation architecture. A current time can be determined when a message is being formed (STEP 602). A best key for use in forming the message can then be determined based on the current time. In one embodiment, for each of a plurality of defined keys, a corresponding transmit lifetime defined for that key can be determined (STEP 604). If the current time is between the start time and the end time of the transmit lifetime defined for that key (Y Branch of STEP 606), that key may be added to a list of best keys (STEP 608).

If there are multiple best keys (Y Branch of STEP 610) the key with the where the start time of the transmit lifetime corresponding to that key is after the current time, and is the most current start time of the corresponding transmit lifetimes for each of the best keys may be selected as the best key (STEP 612). The message to be sent can then be formed using this best key (e.g., the authentication field of the message can be created using the best key if needed), and the message sent (STEP 614).

It may now be useful to an understanding of movements to refer briefly back to the example shared secret profile depicted in FIG. 3. Assume that a network device has been configured with shared secret profile 300 for use in receiving and sending messages for the RADIUS authentication protocol. If such a network device (e.g., an authentication agent at a network device) receives a message at time t1 (the current time) and attempts to validate the message based on the keys defined in each of key structures 302, the network device may evaluate receive lifetime 304*a* of key 1 and determine the current time (t1) is between the start time 320*ar* and the end time 330*ar* of the receive lifetime 304*a* for key 1. Key 1 can then be added to the list of accepted keys. Conversely, the network device may evaluate receive lifetime 304*b* of key 2 and determine the current time (t1) is not between the start time 320*br* and the end time 330*br* of the receive lifetime 304*b* for key 2. Thus, key2 is not added to the set of accepted keys. Consequently, the validation of the message can then be attempted using only key 1. If the message is validated with key 1 the message can be accepted while if the message cannot be validated with key 1 the message may be discarded.

If the network device was forming a message at this same time t1 (the current time), the network device may evaluate transmit lifetime 306*a* of key 1 and determine the current time (t1) is between the start time 320*at* and the end time 330*at* of the transmit lifetime 306*a* for key 1 while current time (t1) is not between the start time 320*bt* and the end time 330*bt* of the transmit lifetime 306*b* for key 2. Key 1 can then be selected as the best key and used to form the message for sending (to the authentication server).

Now suppose some time passes and the network device receives a message at time t2 (the current time) in overlap period 360 and attempts to validate the message based on the keys defined in each of key structures 302. Here, the network device may evaluate receive lifetime 304*a* of key 1 and determine the current time (t2) is between the start time 320*ar* and the end time 330*ar* of the receive lifetime 304*a* for key 1. Key 1 can then be added to the list of accepted keys. Similarly now, the network device may evaluate receive lifetime 304*b* of key 2 and determine the current time (t2) is between the start time 320*br* and the end time 330*br* of the receive lifetime 304*b* for key 2. Thus, key 2 is also added to the set of accepted keys. Consequently, the validation of the message can then be attempted using both key 1 and key 2. If the message is validated with key 1 or key 2 the message can be accepted while if the message cannot be validated with either key 1 or key 2 the message may be discarded.

If the network device is forming a message at time t2 (the current time), the network device may evaluate transmit lifetime 306a of key 1 and determine the current time (t2) is between the start time 320at and the end time 330at of the transmit lifetime 306a for key 1 while current time (t2) is not between the start time 320bt and the end time 330bt of the transmit lifetime 306b for key 2. Key 1 can then be selected as the best key and used to form the message for sending (to the authentication server).

Moving on, if some more time passes and the network device receives a message at time t3 (the current time) in overlap period 350, the network device will again attempt to validate the message based on the keys defined in each of key structures 302. In this case, the network device may evaluate receive lifetime 304a of key 1 and determine the current time (t3) is between the start time 320ar and the end time 330ar of the receive lifetime 304a for key 1. Key 1 can then be added to the list of accepted keys. Similarly now, the network device may evaluate receive lifetime 304b of key 2 and determine the current time (t3) is between the start time 320br and the end time 330br of the receive lifetime 304b for key 2. Thus, key2 is also added to the set of accepted keys. Consequently, the validation of the message can then be attempted using both key 1 and key 2. If the message is validated with key 1 or key 2 the message can be accepted while if the message cannot be validated with either key 1 or key 2 the message may be discarded.

If the network device is forming a message at time t3 (the current time), the network device may evaluate transmit lifetime 306a of key 1 and determine the current time (t3) is not between the start time 320at and the end time 330at of the transmit lifetime 306a for key 1 while current time (t3) is between the start time 320bt and the end time 330bt of the transmit lifetime 306b for key 2. At this point (time t3) key 2 can be selected as the best key and used to form the message for sending (to the authentication server).

Suppose now more time passes and a network device (e.g., an authentication agent at a network device) receives a message at time t4 (the current time). The network device will attempt to validate the message based on the keys defined in each of key structures 302. Thus, the network device may evaluate receive lifetime 304a of key 1 and determine the current time (t4) is not between the start time 320ar and the end time 330ar of the receive lifetime 304a for key 1. Key 1 is not an accepted key. Conversely, the network device may evaluate receive lifetime 304b of key 2 and determine the current time (t4) is between the start time 320br and the end time 330br of the receive lifetime 304b for key 2. Thus, key2 is added to the set of accepted keys. In this instance, the validation of the message can then be attempted using only key 2. If the message is validated with key 2 the message can be accepted while if the message cannot be validated with key 2 the message may be discarded.

If the network device was forming a message at this same time t4 (the current time), the network device may evaluate transmit lifetime 306a of key 1 and determine the current time (t4) is not between the start time 320at and the end time 330at of the transmit lifetime 306a for key 1 while current time (t4) is between the start time 320bt and the end time 330bt of the transmit lifetime 306b for key 2. Key 2 can then be selected as the best key and used to form the message for sending (to the authentication server).

It will be understood that while specific embodiments have been presented herein, these embodiments are merely illustrative, and not restrictive. Rather, the description is intended to describe illustrative embodiments, features and functions in order to provide an understanding of the embodiments without limiting the disclosure to any particularly described embodiment, feature, or function, including any such embodiment, feature, or function described. While specific embodiments of, and examples for, the embodiments are described herein for illustrative purposes only, various equivalent modifications are possible within the spirit and scope of the invention, as those skilled in the relevant art will recognize and appreciate.

As indicated, these modifications may be made in light of the foregoing description of illustrated embodiments and are to be included within the spirit and scope of the disclosure. Thus, while particular embodiments are described, a latitude of modification, various changes and substitutions are intended in the foregoing disclosures, and it will be appreciated that in some instances some features of embodiments of the invention will be employed without a corresponding use of other features, and features described with respect to one embodiment may be combined with features of other embodiments without departing from the scope and spirit of the disclosure as set forth.

What is claimed is:

1. A method for switching keys at a network device, comprising:
    receiving a first message from an authentication server at a network device;
    determining one or more accepted keys for validation of the first message from a plurality of keys based on a current time associated with validation of the first message and an end time of a corresponding receive lifetime for each of the plurality of keys, wherein the end time of the receive lifetime for each accepted key is after the current time and the end time of the corresponding receive lifetime for each of the plurality of keys indicate when that respective key can be utilized as an acceptable key for validation of received messages;
    attempting validation of the first message with the one or more accepted keys;
    accepting the message when the first message is validated with any one of the accepted keys; and
    discarding the first message when the validation of the first message with the one or more accepted keys fails;
    determining a best key from the plurality of keys based on the current time and a start time of a corresponding transmit lifetime for each of the plurality of keys, wherein the best key is a key of the plurality of keys where the start time of the transmit lifetime corresponding to that key is after the current time, and is the most current start time of the corresponding transmit lifetimes for each of the plurality of keys;
    in response to reception of the first message, when the first message is accepted, forming a second message for the authentication server based on the best key; and
    sending the second message to the authentication server.

2. The method of claim 1, wherein a start time of the receive lifetime corresponding to the best key is before the start time of the transmit lifetime corresponding to the best key.

3. The method of claim 1, wherein the best key is one of the accepted keys.

4. The method of claim 1, wherein:
the second message is received from the network device at an authentication server, and the second message is validated at the authentication server using the best key.

5. The method of claim 4, wherein the first message was formed at the authentication server using one of the one or more accepted keys.

6. The method of claim 4, wherein both the first message and the second message are formed according to the Remote Authentication Dial-In User Service (RADIUS) protocol.

7. The method of claim 1, wherein the plurality of keys are stored in a key data structure at the network device.

8. A method, comprising:
storing a first key and a second key at a network device, wherein the first key has a corresponding receive lifetime with a start time and an end time and a corresponding transmit lifetime with a start time and an end time, and the second key has a corresponding receive lifetime with a start time that is before the end time of the receive lifetime of the first key wherein the start time and end time of the corresponding receive lifetime for the first key indicate when the first key can be utilized as an acceptable key for validation of received messages and the start time and end time of the corresponding receive lifetime for the second key indicates when the second key can be utilized as an acceptable key for validation of received messages;
receiving a first message at the network device at a first time that is before the end time of the receive lifetime corresponding to the first key and after the start time of the receive lifetime of the second key;
determining that the first key and the second key are both accepted keys based on the receive lifetime corresponding to the first key and the receive lifetime corresponding to the second key;
attempting validation of the first message with the first key and the second key;
accepting the message when the first message is validated with the first key or the second key; and
discarding the first message when the validation of the first message with the first key and the second key fails;
receiving a second message at the network device at a second time that is after the end time of the receive lifetime corresponding to the first key and after the start time of the receive lifetime of the second key;
determining that the first key is not an accepted key and the second key is an accepted key based on the receive lifetime corresponding to the first key and the receive lifetime corresponding to the second key;
attempting validation of the second message with the second key;
accepting the second message when the second message is validated with the second key; and
discarding the second message when the validation of the second message with the second key fails.

9. The method of claim 8, further comprising:
determining the first time is before the end time of the transmit lifetime of the first key; and
forming a second message based on the first key.

10. The method of claim 9, wherein:
the second message is received from the network device at an authentication server, and the second message is validated at the authentication server using the first key or the second key.

11. The method of claim 8, wherein the end time of the transmit lifetime of the first key is the same as the start time of the transmit lifetime of the second key, and the method further comprises:
determining the first time is after the start time of the transmit lifetime of the second key; and
forming a second message based on the second key.

12. The method of claim 11, further comprising:
receiving the second message from the network device at an authentication server; and
validating the message using the first key or the second key at the authentication server.

13. A non-transitory computer readable medium comprising instructions for switching keys at a network device, including instructions for:
receiving a first message from an authentication server at a network device;
determining one or more accepted keys for validation of the first message from a plurality of keys based on a current time associated with validation of the first message and an end time of a corresponding receive lifetime for each of the plurality of keys, wherein the end time of the receive lifetime for each accepted key is after the current time and the end time of the corresponding receive lifetime for each of the plurality of keys indicate when that respective key can be utilized as an acceptable key for validation of received messages;
attempting validation of the first message with the one or more accepted keys;
accepting the message when the first message is validated with any one of the accepted keys; and
discarding the first message when the validation of the first message with the one or more accepted keys fails;
determining a best key from the plurality of keys based on the current time and a start time of a corresponding transmit lifetime for each of the plurality of keys, wherein the best key is a key of the plurality of keys where the start time of the transmit lifetime corresponding to that key is after the current time, and is the most current start time of the corresponding transmit lifetimes for each of the plurality of keys;
in response to reception of the first message, when the first message is accepted, forming a second message for the authentication server based on the best key; and
sending the second message to the authentication server.

14. The non-transitory computer readable medium of claim 13, wherein a start time of the receive lifetime corresponding to the best key is before the start time of the transmit lifetime corresponding to the best key.

15. The non-transitory computer readable medium of claim 13, wherein the best key is one of the accepted keys.

16. The non-transitory computer readable medium of claim 13, wherein:
the second message is received from the network device at an authentication server, and the second message is validated at the authentication server using the best key.

17. The non-transitory computer readable medium of claim 16, wherein the first message was formed at the authentication server using one of the one or more accepted keys.

18. The non-transitory computer readable medium of claim 16, wherein both the first message and the second message are formed according to the Remote Authentication Dial-In User Service (RADIUS) protocol.

19. The non-transitory computer readable medium of claim 13, wherein the plurality of keys are stored in a key data structure at the network device.

20. A non-transitory computer readable medium, comprising instructions for:
  storing a first key and a second key at a network device, wherein the first key has a corresponding receive lifetime with a start time and an end time and a corresponding transmit lifetime with a start time and an end time, and the second key has a corresponding receive lifetime with a start time that is before the end time of the receive lifetime of the first key wherein the start time and end time of the corresponding receive lifetime for the first key indicate when the first key can be utilized as an acceptable key for validation of received messages and the start time and end time of the corresponding receive lifetime for the second key indicates when the second key can be utilized as an acceptable key for validation of received messages;
  receiving a first message at the network device at a first time that is before the end time of the receive lifetime corresponding to the first key and after the start time of the receive lifetime of the second key;
  determining that the first key and the second key are both accepted keys based on the receive lifetime corresponding to the first key and the receive lifetime corresponding to the second key;
  attempting validation of the first message with the first key and the second key;
  accepting the message when the first message is validated with the first key or the second key; and
  discarding the first message when the validation of the first message with the first key and the second key fails;
  receiving a second message at the network device at a second time that is after the end time of the receive lifetime corresponding to the first key and after the start time of the receive lifetime of the second key;
  determining that the first key is not an accepted key and the second key is an accepted key based on the receive lifetime corresponding to the first key and the receive lifetime corresponding to the second key;
  attempting validation of the second message with the second key;
  accepting the second message when the second message is validated with the second key; and
  discarding the second message when the validation of the second message with the second key fails.

21. The non-transitory computer readable medium of claim 20, further comprising instructions for:
  determining the first time is before the end time of the transmit lifetime of the first key; and
  forming a second message based on the first key.

22. The non-transitory computer readable medium of claim 21, wherein:
  the second message is received from the network device at an authentication server, and the second message is validated at the authentication server using the first key or the second key.

23. The non-transitory computer readable medium of claim 20, wherein the end time of the transmit lifetime of the first key is the same as the start time of the transmit lifetime of the second key, and the method further comprises:
  determining the first time is after the start time of the transmit lifetime of the second key; and
  forming a second message based on the second key.

24. The non-transitory computer readable medium of claim 23, further comprising instructions for:
  receiving the second message from the network device at an authentication server; and
  validating the message using the first key or the second key at the authentication server.

* * * * *